United States Patent
Li et al.

(10) Patent No.: US 8,074,212 B2
(45) Date of Patent: Dec. 6, 2011

(54) METHOD AND APPARATUS FOR SOFTWARE UPGRADE IN A DIGITAL TELEVISION RECEIVING DEVICE

(75) Inventors: Yaohui Li, Shenzhen (CN); Yuqin Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 954 days.

(21) Appl. No.: 11/911,197

(22) PCT Filed: Apr. 11, 2006

(86) PCT No.: PCT/CN2006/000647
§ 371 (c)(1),
(2), (4) Date: Feb. 8, 2008

(87) PCT Pub. No.: WO2006/108351
PCT Pub. Date: Oct. 19, 2006

(65) Prior Publication Data
US 2008/0216100 A1    Sep. 4, 2008

(30) Foreign Application Priority Data
Apr. 14, 2005    (CN) .......................... 2005 1 0064280

(51) Int. Cl.
*G06F 9/44*    (2006.01)
(52) U.S. Cl. .................... 717/168; 717/172; 717/173
(58) Field of Classification Search .............. 717/168, 717/172, 173
See application file for complete search history.

(56) References Cited

U.S. PATENT DOCUMENTS

| | | | |
|---|---|---|---|
| 7,120,926 B1 | 10/2006 | Safadi et al. | |
| 7,159,214 B2 * | 1/2007 | Rajaram et al. | 717/172 |
| 7,490,321 B2 * | 2/2009 | Chen et al. | 717/168 |
| 2003/0140237 A1 | 7/2003 | Bacon et al. | |
| 2003/0163508 A1 * | 8/2003 | Goodman | 709/100 |
| 2003/0236970 A1 * | 12/2003 | Palmer et al. | 713/1 |
| 2004/0197073 A1 | 10/2004 | Oesterreicher et al. | |
| 2007/0089108 A1 * | 4/2007 | Chen et al. | 717/168 |
| 2007/0169099 A1 * | 7/2007 | Rao et al. | 717/168 |

FOREIGN PATENT DOCUMENTS

| | | |
|---|---|---|
| CN | 1360256 A | 7/2002 |
| CN | 1387731 A | 12/2002 |
| CN | 1509080 A | 6/2004 |
| JP | WO2004/091207 A1 | 10/2004 |
| RU | 2181929 C2 | 4/2002 |
| WO | WO 01/17265 A1 | 3/2001 |
| WO | W003009136 A1 | 1/2003 |
| WO | W02004/090686 A2 | 10/2004 |

\* cited by examiner

*Primary Examiner* — Andy Ho
(74) *Attorney, Agent, or Firm* — Leydig, Voit & Mayer, Ltd.

(57) ABSTRACT

A method and an apparatus for software upgrade in a digital television receiving device are disclosed. The method includes multiplexing service software into a transport stream according to a predefined protocol, extracting by the digital television receiving device data of the service software from the transport stream and storing the data, restarting the digital television receiving device, so that digital television receiving device software and the service software may obtain addresses of interface functions of the opposite party, and updating by the digital television receiving device software and the service software, default addresses of the interface functions of the service software and the digital television receiving device software according to the obtained addresses. With the invention, the digital television receiving device software and the service software may be independent from each other, and may be upgraded separately.

5 Claims, 3 Drawing Sheets

METHOD AND APPARATUS FOR SOFTWARE UPGRADE IN A DIGITAL TELEVISION RECEIVING DEVICE

FIELD OF THE INVENTION

The invention relates to the field of digital television, and particularly, to a method and an apparatus for software upgrade in a digital television receiving device.

BACKGROUND OF THE INVENTION

In addition to abundant digital television programs, broadcast television operators have to frequently offer personalized, bi-directionally interactive, and development-sustainable digital television data services in order to attract the subscribers, to boost the growth of the number of digital television subscribers, and to excavate new profit increasing points.

In the field of digital television, a digital television receiving device provider and a digital television service provider are usually not the same entity. However, their software is closely linked with each other on a digital television receiving device and neither is dispensable. The software from the digital television receiving device provider is oriented to providing fundamental and hardware-level software operation platforms, for example, providing a stable operating system platform, resource management, hardware driver, image decoding, and screen displaying. The software from the digital television service provider is oriented to a secondary development on the basis of the platforms provided by the digital television receiving device provider, i.e., providing digital television data services such as Multimedia Messaging Service, Short Message Service, stock information service, and information consultation, according to the requirements of the broadcast operators. The different orientations bring about different requirements for software upgrades.

Digital television receiving device provider software currently available in the market usually includes three parts, such as system terminal software (i.e. digital television receiving device software or set-top box terminal software), service software, and interface adaptation software. After being processed by a compiler and a linker, these three parts are stored as a whole in a nonvolatile memory in a digital television receiving device under certain rules. Any partial modification to data in one of the three parts regardless of the other two parts may cause a system collapse during running. Therefore, when any of the three parts needs an upgrade, a Makefile has to be re-created. The three parts have to be upgraded together. FIG. 1 shows the principle of a conventional upgrade solution.

When a service provider requires to upgrade his software, the conventional upgrade solution executes the following steps.

(A) A compiler coordinated with the CPU of the digital television receiving device is obtained to make a Makefile, to compile service software, and to create a service software library.

(B) The digital television receiving device modifies the Makefile, creates a digital television receiving device software library and an interface adaptation module library.

(C) The digital television receiving device links the service software library, the digital television receiving device software library, and the interface adaptation module library into an object file, and generates an executable file.

(D) The executable file is multiplexed into a Transport Stream (TS) via an upgrade server according to a predefined protocol.

(E) An upgrade module of the digital television receiving device software receives and extracts the data, and assembles a new upgrade file;

(F) The new upgrade file is written into a nonvolatile memory (e.g., a FLASH).

Apparently, in the conventional technical solution, the digital television receiving device software has to be upgraded together with the service software. However, the digital television service provider has a much higher demand for software upgrades than the digital television receiving device provider. In consideration of the inconvenience of the subscribers experienced during the upgrade process, the digital television receiving device provider is often unwilling to upgrade the software, or is unwilling to provide assistance to the digital television service provider to upgrade the software. Undoubtedly, this may cause unnecessary troubles in the development of digital television services. Due to the fact that the digital television receiving device software has to be upgraded at the same time when the service software is upgraded, the service software provider is restricted by the digital television receiving device provider sometimes. In addition, in the case of a narrow bandwidth, it will take a long time to upgrade the software, resulting in a poor experience of the subscriber, and the bandwidth of the multiplexer will be wasted.

SUMMARY OF THE INVENTION

In view of the above, examples of the invention provide a method and an apparatus for software upgrade in a digital television receiving device, to solve the problem in the prior art that the terminal software of the digital television receiving device has to be upgraded at the same time when the service software needs upgrading in the digital television receiving device.

Examples of the invention provide a method for software upgrade in a digital television receiving device. The method includes: multiplexing service software into a transport stream according to a predefined protocol, extracting, by the digital television receiving device, data of the service software from the transport stream and storing the data of the service software, restarting the digital television receiving device, so that digital television receiving device software obtains addresses of interface functions of the service software, and the service software obtains addresses of interface functions of the digital television receiving device software, and updating, by the digital television receiving device software, default addresses of the interface functions of the service software according to the addresses obtained by the digital television receiving device software, and updating, by the service software, default addresses of the interface functions of the digital television receiving device software according to the addresses obtained by the service software.

Before storing the data of the service software, the method may further include checking integrity and/or validity of the data of the service software. The data of the service software may be stored in a nonvolatile memory after the checking is passed. The method may further include invoking, by the digital television receiving device software, an initialization interface of the service software, and sending the addresses of the interface functions of the digital television receiving device software required by the service software to the service software, and sending, by the service software, the addresses of the interface functions of the service software required by the digital television receiving device software to the digital television receiving device software. The method may further include invoking, by the digital television receiving device software, a relocation function provided in an operating system to relocate the service software, and returning, by the relocation function, relocated addresses of the interface functions of the service software.

Other examples of the invention also provide a software loading apparatus for software installation and upgrade, which includes an initialization interface module, a new version service software processing module, a service software interface extraction module, and a service software interface update module. The new version service software processing module is adapted for detecting and storing service software of a new version, and returning storage location of the service software to the initialization interface module. The initialization interface module is adapted for interacting with digital television receiving device software, receiving an invocation instruction, and invoking the service software interface extraction module to extract interface information of service software under the invocation instruction. The service software interface extraction module is adapted for interacting with the service software, and extracting the interface information of the service software, and sending the interface information of the service software to the service software interface update module. The service software interface update module is adapted for updating default addresses of interface functions of the service software required by the digital television receiving device software in accordance with the interface information of the service software provided by the service software interface extraction module.

The software loading apparatus may further include a checking module, adapted for receiving an instruction from the new version service software processing module, checking validity and/or integrity of the service software, and returning a result of the checking to the new version service software processing module. The service software interface extraction module may be further adapted for extracting an initialization interface of the service software, sending addresses of interface functions of the digital television receiving device software required by the service software to the service software, receiving addresses of interface functions of the service software, required by the digital television receiving device software, from the service software, and returning the addresses of the interface functions of the service software to the service software interface update module. The service software interface extraction module may be further adapted for invoking a relocation function module provided in an operating system of a digital television receiving device, relocating the service software, and returning relocated address of the interface functions of service software to the service software interface update module. The software loading apparatus may be integrated in a digital television receiving device, a service software server, or any other separate devices.

With the technical solutions according to such examples of the invention, the service software and the digital television receiving device terminal software may be upgraded separately since there is no direct function interface between the service software and the terminal software. In other words, the service software and the terminal software are independent from each other.

With the method according to such examples of the invention, the operators need not to build their own upgrade servers repeatedly, so that the networking cost may be saved. Since the service software is independent from the digital television receiving device terminal software, in the case of the originally allocated bandwidth of the upgrade server, the service software may be upgraded quickly, and the waiting time of the users may be reduced. Since the service software is independent from the digital television receiving device terminal software, the service software may be stored in a nonvolatile memory independent of the digital television receiving device terminal software. In this way, the service software may be encrypted and compressed, so as to protect the service software from being disassembled. Thus the software security may be enhanced significantly.

DETAILED DESCRIPTION OF THE EMBODIMENTS

Figure 1:
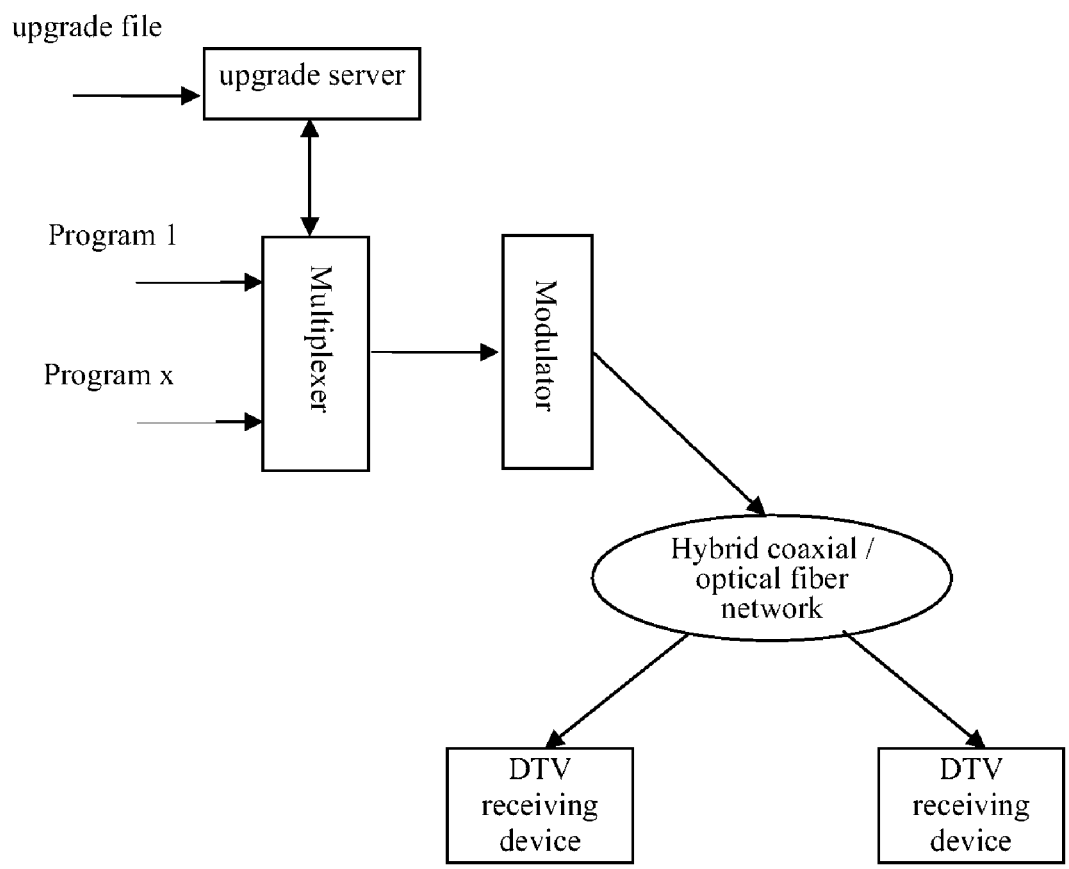
FIG. 1 shows a technical solution for upgrading digital television receiving device software and service software in the prior art.
Figure 2:
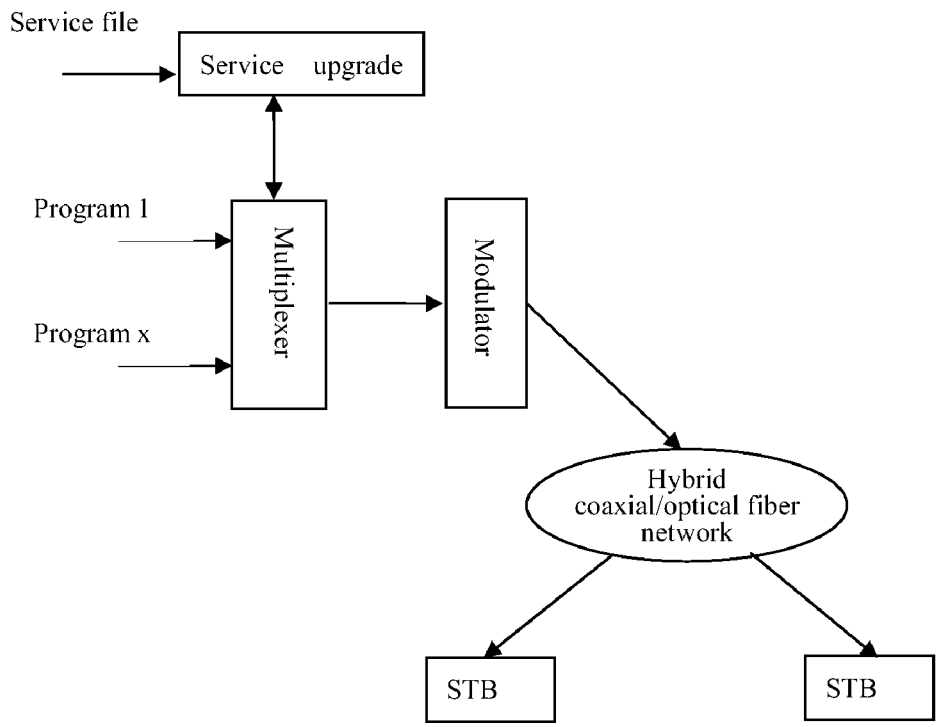
FIG. 2 shows a technical solution for upgrading digital television receiving device software and service software according to an embodiment of the invention.
Figure 3:
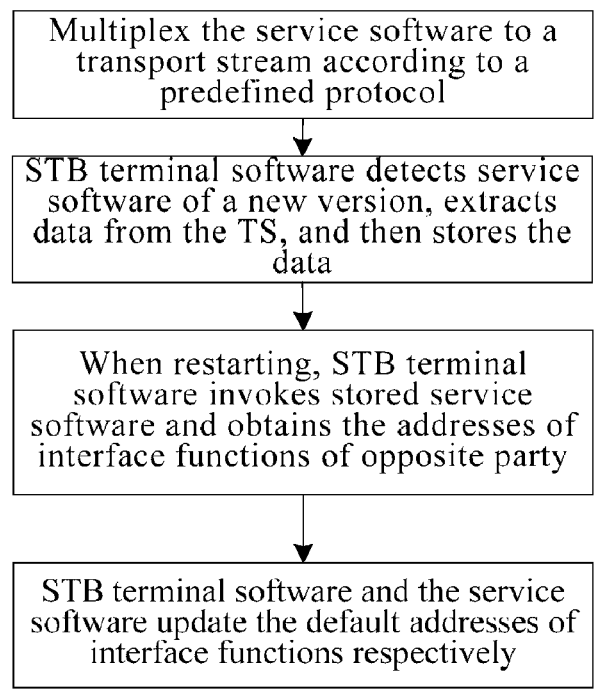
FIG. 3 is a flow diagram showing a method for software upgrade according to an embodiment of the invention.

Hereinafter the principle of the invention will be described with a set-top box (STB), which is a digital television receiving device, as an example. FIG. 2 shows a technical solution for upgrading according to an example of the invention. As shown in FIG. 2, an upgraded service file is sent to a service upgrade server separately. A compiler coordinated with the CPU of the set-top box is obtained, to create a Makefile, compile the service software and build a service software library. FIG. 3 shows an upgrade process according to the invention as follows.

A. A service software is multiplexed into a specified transport stream (TS) by a service software upgrade server according to a predefined protocol.

B. A set-top box terminal software detects the service software of a new version, extracts data, and stores the data in a nonvolatile memory.

C. After the set-top box terminal software is restarted, the set-top box terminal software obtains addresses of interface functions of the service software, and the service software obtains addresses of interface functions of the set-top box terminal software.

D. The set-top box terminal software updates required default addresses of the interface functions of the service software by using the addresses obtained by the set-top box terminal software, and the service software updates required default addresses of the interface functions of the set-top box terminal software by using the addresses obtained by the service software.

After storing the service software of the new version, the set-top box terminal writes a specified identification into a specified storage unit. When starting next time, the set-top box terminal software reads the specified identification, e.g., "DSMCCUPGRADE", from the specified storage unit. If the set-top box terminal finds that the identification read from the specified storage unit is the specified identification indicating that the service software of the new version is available, the set-top box terminal proceeds to the upgrade process, i.e., the process for upgrading service software. Otherwise, the set-top box terminal proceeds into a normal service process.

In step B, after detecting the service software of the new version and extracting the data, the set-top box terminal software may check the integrity, the validity, and the verification version of the service software, and check the validity of the upgrade information. After the check is passed, the set-top box terminal software stores the data in the nonvolatile memory.

The service software may be a re-locatable object file or an absolute location object file.

In a first embodiment of the invention, after the creation of the service software library, the service software library may be absolutely located to a negotiated memory position by using a specialized location tool. In this case, an upgrade method according to the invention is as follows.

(A1) An absolute location service software is multiplexed into a specified transport stream (TS) by a service software upgrade server according to a specified protocol (e.g., Digital Storage Media—Command & Control (DSMCC) protocol).

(B1) The set-top box terminal software detects the service software of a new version, extracts data, and checks the validity and integrity of the service software, then stores the service software after the check is passed.

(C1) When restarting, the set-top box terminal software invokes an initialization interface of the service software, and sends required addresses of interface functions of the set-top box terminal software to the service software. In response, the initialization interface of the service software returns addresses of interface functions of the service software required by the set-top box terminal software to the set-top box terminal software.

(D1) When starting regularly, the service software updates internally defined default addresses of the set-top box terminal software according to the addresses of the interface functions of the set-top box terminal software provided by the set-top box terminal software.

(E1) The set-top box terminal software updates default addresses of the interface functions of the service software required by the set-top box terminal software according to the addresses of the interface function of the service software provided by the service software.

(F1) The set-top box terminal software and the service software both use the updated addresses.

In a second embodiment of the invention, for a set-top box terminal that partially supports software relocation, the service software may be built into a re-locatable object file by using the library functions provided in the operating system of the set-top box terminal. In this case, an upgrade method according to the invention is as follows.

(A2) A service software is multiplexed into a specified transport stream (TS) by a service software upgrade server according to a specified protocol.

(B2) The set-top box terminal software detects the service software of a new version, extracts data, and checks the validity and integrity of the service software, then stores the service software after the check is passed.

(C2) When restarting, the set-top box terminal software invokes a relocation function provided in the operating system to relocate the service software, and returns relocated addresses of the interface functions of the service software.

(D2) After starting regularly, the service software updates internally defined default addresses of the set-top box terminal software according to the addresses of the interface functions of the service software provided by the set-top box terminal software.

(E2) The set-top box terminal software updates default addresses of the interface functions of the service software required by the set-top box terminal software according to the addresses of functions provided by the service software.

(F2) The set-top box terminal software and the service software both use the updated interface addresses.

Embodiments of the invention also provide a loading apparatus. The apparatus is designed to extract the upgrade file data of a service software from a transport stream (TS) according to a specified protocol, e.g., DSMCC protocol, and to write the data into a nonvolatile memory e.g., FLASH. In addition, when the service software starts, the apparatus may check the version, the validity, and the integrity of the service software, and check the validity of upgrade information, and the like.

Figure 4:
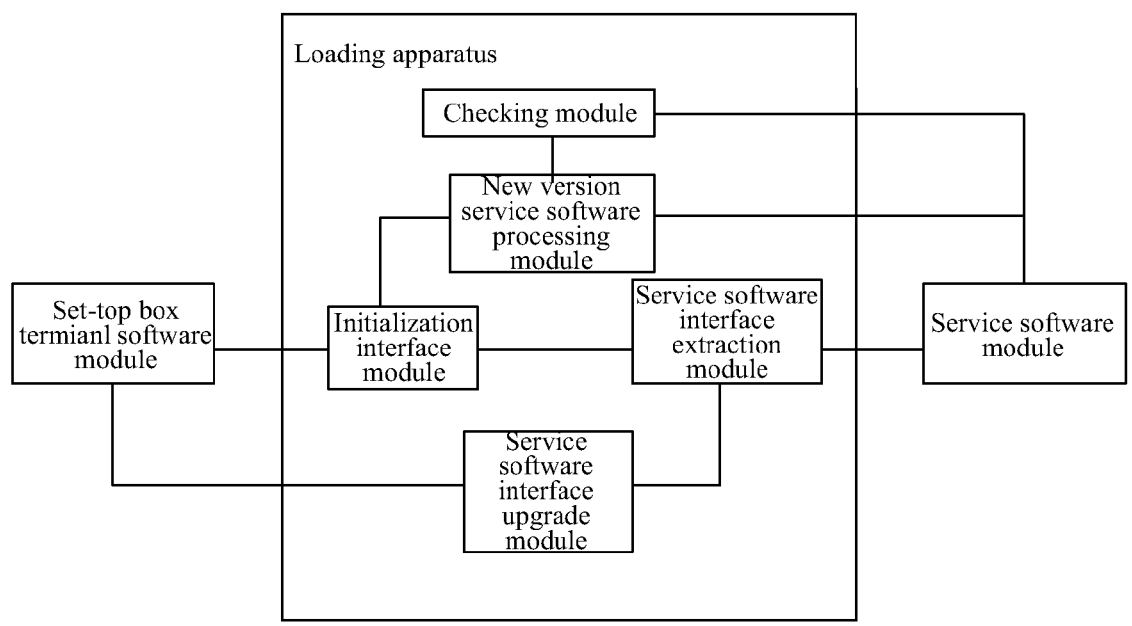
FIG. 4 is a structural diagram showing a downloading module according to an embodiment of the invention.

As shown in FIG. 4, the loading apparatus includes an initialization interface module, a new version service software processing module, a service software interface extraction module, and a service software interface update module. When a service software is multiplexed into a specified transport stream (TS) by a service software upgrade server according to a specified protocol, the new version service software processing module detects the service software of a new version, extracts data, and stores the service software, and returns the storage location of the service software to the initialization interface module.

When the set-top box terminal software starts next time, the set-top box terminal software invokes the initialization interface module. The initialization interface module invokes the service software interface extraction module requesting to extract interface information of the service software. The service software interface extraction module interacts with the modules of the service software to extract the interface information of the service software, and sends the interface information of service software to the service software interface update module. The service software interface update module updates default addresses of the interface functions of the service software required by the set-top box terminal software according to addresses of functions contained in the interface information provided by the service software.

In a first implementation of the loading apparatus according to one embodiment of the invention, after a service software is multiplexed into a specified transport stream (TS) by a service software upgrade server according to a specified protocol, the new version service software processing module detects the service software of a new version, extracts data, and sends a checking instruction to a checking module. The checking module receives the instruction and checks the validity and integrity of the service software, and then returns the result to the new version service software processing module after the checking is passed. The new version service software processing module stores the service software, and returns the storage location of the service software to the initialization interface module.

When the set-top box terminal software starts next time, the set-top box terminal software invokes the initialization interface module. The initialization interface module invokes the service software interface extraction module requesting to extract interface information of the service software. The service software interface extraction module extracts the initialization interface of service software, sends interface addresses of the set-top box terminal software to the service software, and receives addresses of interface functions of the service software, required by the set-top box terminal software, from the service software, and sends the addresses of the interface functions of the service software to the service software interface update module. The service software interface update module updates default addresses of the interface functions of the service software according to the addresses of the interface functions provided by the service software, as required by the set-top box terminal software.

In a second implementation of the loading apparatus according to another embodiment of the invention, after a service software in the form of a re-locatable object file is multiplexed to a specified transport stream (TS) by a service software update server according to a specified protocol, the new version service software processing module detects the service software of a new version and extracts data, and sends a checking instruction to a checking module. The checking module receives the instruction, checks the validity and integrity of the service software, and then returns the result to the new version service software processing module when the checking is passed. The new version service software processing module stores the service software, and returns the storage location of the service software to the initialization interface module.

When the set-top box terminal software starts next time, the set-top box terminal software invokes the initialization interface module. The initialization interface module invokes the service software interface extraction module requesting to extract interface information of the service software. The service software interface module invokes a relocation function module provided in the operating system of the set-top box to relocate the service software, and sends the relocated addresses of the interface functions of the service software to the service software interface update module. The service software interface update module updates default addresses of the interface functions of the service software interface functions according to the addresses of the interface functions provided by the service software, as required by the set-top box terminal software.

With the method and apparatus for software upgrade according to these examples of the invention, the service software and the digital television receiving device software may be upgraded separately since there is no direct function interface between the service software and the digital television receiving device software, that is, the service software and the digital television receiving device software are independent from each other. The operators need not to build their own upgrade servers repeatedly, so that the networking cost may be saved. In addition, with the method and apparatus of the invention, quick upgrade of the service software may be achieved, such that the waiting time may be reduced for users. Further, the security of the intellectual properties of the service providers may be enhanced greatly.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for software upgrade in a digital television receiving device, comprising:

multiplexing service software into a transport stream according to a predefined protocol;

extracting, by the digital television receiving device, data of the service software from the transport stream and storing the data of the service software;

restarting the digital television receiving device, so that digital television receiving device software obtains addresses of interface functions of the service software, and the service software obtains addresses of interface functions of the digital television receiving device software;

updating, by the digital television receiving device software, default addresses of the interface functions of the service software according to the addresses obtained by the digital television receiving device software, and updating, by the service software, default addresses of the interface functions of the digital television receiving device software according to the addresses obtained by the service software.

2. The method according to claim 1, wherein, before storing the data of the service software, the method further comprises: checking at lease one of integrity or validity of the data of the service software.

3. The method according to claim 2, wherein, the data of the service software is stored in a nonvolatile memory after the checking is passed.

4. The method according to claim 1, wherein, the method further comprises: invoking, by the digital television receiving device software, an initialization interface of the service software, and sending the addresses of the interface functions of the digital television receiving device software required by the service software to the service software, and sending, by the service software, the addresses of the interface functions of the service software required by the digital television receiving device software to the digital television receiving device software.

5. The method according to claim 1, further comprising: invoking, by the digital television receiving device software, a relocation function provided in an operating system to relocate the service software, and returning, by the relocation function, relocated addresses of the interface functions of the service software.

* * * * *

UNITED STATES PATENT AND TRADEMARK OFFICE
CERTIFICATE OF CORRECTION

| | | |
|---|---|---|
| PATENT NO. | : 8,074,212 B2 | |
| APPLICATION NO. | : 11/911197 | |
| DATED | : December 6, 2011 | |
| INVENTOR(S) | : Li et al. | |

It is certified that error appears in the above-identified patent and that said Letters Patent is hereby corrected as shown below:

Column 8, line 36, "at lease" should read -- at least --.

Signed and Sealed this
Twenty-eighth Day of February, 2012

David J. Kappos
*Director of the United States Patent and Trademark Office*